FIG. I.

Leonard Gluckstein
William Tom Everington
INVENTORS

Leonard Gluckstein
William Tom Everington
INVENTORS

INVENTORS.
Leonard Gluckstein
William Tom Everington

Leonard Gluckstein
William Tom Everington
INVENTORS

BY
Pierce, Scheffler & Parker
ATTORNEYS

Leonard Gluckstein
William Tom Everington
INVENTORS

3,040,647
PREPARATION OF BEVERAGES

Leonard Gluckstein, London, and William Tom Everington, West Byfleet, England, assignors to J. Lyons & Company Limited, London, England, a British company
Filed Nov. 13, 1959, Ser. No. 852,767
Claims priority, application Great Britain Nov. 28, 1958
5 Claims. (Cl. 99—239)

This invention relates to the production of beverages from citrus fruits, and especially oranges.

As far as we are aware beverages of this kind have in the past, when made in commercial quantities, always been made in bulk and the resultant product, consisting of a fruit extract and added liquid, transported in this form to the point-of-sale. The present invention is concerned with the production of a citrus fruit beverage, and especially an orange beverage, substantially at the point-of-sale from whole fruit, easily and rapidly, so that the beverage can be prepared as and when required. Thus the consumer is accordingly offered a freshly made beverage. With citrus fruits this is highly desirable since the storage of citrus fruit beverages, without deterioration of flavour or quality, is a problem which is difficult of solution. Moreover, by preparing the beverage at the point-of-sale from the whole fruit, there is considerable economy in transport, as compared with the usual process in which the beverage is transported as a liquid.

The invention therefore provides an apparatus for the preparation of a beverage from whole citrus fruits, and comprising a fruit comminuting means, a receptacle for comminuted fruit, liquid heating means, means for feeding heated liquid to said receptacle, means for agitating the mixture of comminuted fruit and heated liquid, and means for adding a relatively cold liquid to the heated liquid and comminuted fruit.

The invention also provides an apparatus for the preparation of a beverage from whole citrus fruit, and comprising a fruit comminuting means, a receptacle for comminuted fruit, means for producing a hot sugar syrup in said receptacle, means for agitating the mixture of comminuted fruit and hot sugar syrup, and means for adding relatively cold water to the hot sugar syrup and comminuted fruit.

Other features and advantages of the invention will appear from the following description in conjunction with the accompanying drawings, in which.

Figure 1:
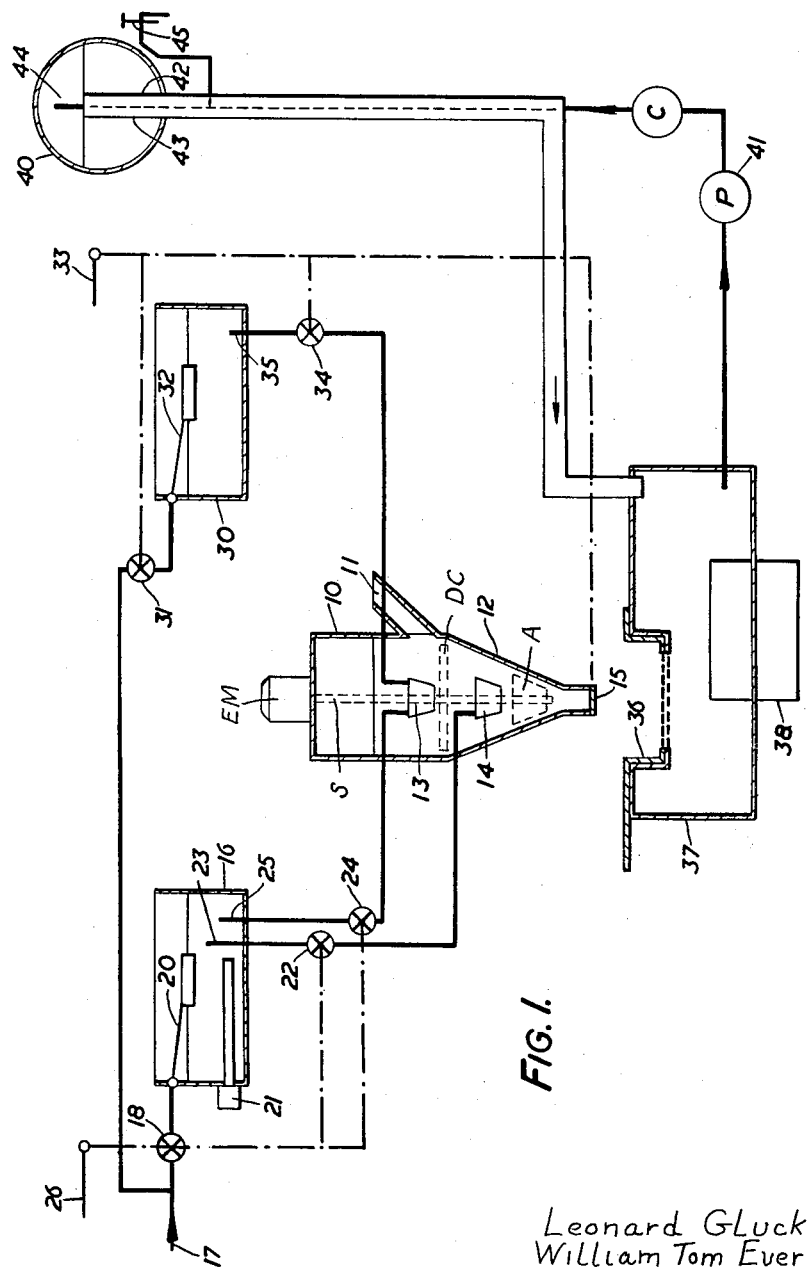
FIGURE 1 is a schematic representation of an embodiment of the present invention.

The schematic diagram represents apparatus which comprises a converter vessel 10, having above its upper part an electric motor EM, with its spindles vertical, and driving a fruit comminuting means in the form of a circular disc cutter DC arranged at its lower end. Fruit to be comminuted is fed to an inlet funnel 11 and the comminuted fruit is discharged from below the funnel into a removable conical receptacle portion 12. In the upper part of the converter vessel is a funnel 13 which admits to the space immediately above the cutting disc and a further funnel 14 which admits to the conical receptacle portion 12. The outlet from receptacle portion 12 is closed at its bottom end by a valve 15.

There is first inserted through the funnel 14 at quantity of sugar, together with a small quantity of citric acid and a colouring material. A measured quantity of very hot water is then inserted through funnel 14. To enable this to be done easily, a hot water tank 16 is provided, fed from a cold water supply 17 through a control valve 18. The level of water in tank 16 is maintained by a float valve 20, and the water is heated by an electric immersion heater 21. The desired quantity of hot water is fed to funnel 14 by opening a further control valve 22, which is connected to an overflow pipe 23 in tank 16. Since the float valve 20 will maintain the level of water in tank 16 at a predetermined level a predetermined quantity of hot water will be discharged from the overflow pipe 23 into the receptacle portion 12. At this stage, the motor EM in converter vessel 10 is started and an agitator A, extending into the conical receptacle portion 12 and mounted on an extension of the shaft S, causes the sugar and additives to be fully dissolved in the hot water.

After a short time, when the sugar has been completely dissolved, a quantity of whole fruit, in the present case oranges, is fed to funnel 11 and the fruit thereupon rapidly comminuted and discharged into the hot and rotating sugar syrup in receptacle portion 12. When the oranges have been fed, a further small quantity of hot water is fed to funnel 13, above the cutting disc DC, by means of a valve 24 which communicates with an overflow pipe 25 which is slightly below the level of pipe 23 in tank 16. The additional hot water cleans the space above the cutting disc, removes any particles of fruit which may be adhering to the upper surface of the blade, or to the immediate under surface thereof, and completes the extraction of the fruit. The additional hot water finds its way through the disc and into the receptacle portion 12.

To facilitate the operation of valves 22 and 24, these are conveniently operated from a common control handle indicated diagrammatically at 26. In order that the flow of cold water into tank 16 shall cease when the hot water is being removed, thus to ensure the accurate measuring of hot water, the valve 18 can also be coupled to handle 26, so that this last valve is closed when valves 22 or 24 are open. The handle 26 may have a three-positional operation so that the separate quantities of hot water can be supplied independently.

The sugar syrup, the comminuted fruit and the newly-added hot water are agitated by the agitator A, and provided that the temperature of the water is high enough, an adequate extraction of the essential oils from the fruit is effected. In practice, a temperature of the order of 200° F. has been found practicable in securing rapid extraction which then only takes a few seconds. However, in the service for which the apparatus described is required, the product must be brought very rapidly to drinking temperature, means must be provided for reducing the temperature of the extract. A major reduction in the temperature is ensured by adding to the extract a quantity of chilled water. This water is fed from a further tank 30, also fed from the cold water supply 17, through a control valve 31, the level of the water in the tank being maintained by a float valve 32. Under the control of the operator, when it is desired to add the cold water, a handle 33 is operated which closes valve 31 and opens a valve 34 to feed water from an overflow pipe 35 in the tank 30. In the manner previously described, this ensures that a predetermined quantity of chilled water is fed through valve 34, and this is passed to the funnel 13. At the same time as valve 31 is closed and valve 34 opens, the valve 15 at the bottom of container 12 is also opened, being coupled to handle 33. Thereby the contents of receptacle portion 12 are allowed to fall into a removable strainer 36, by which most of the solid parts of the mixture are retained, and therethrough into a further receptacle such as a main reservoir 37. The supply of cold water from tank 30 ensures that after this operation the converter vessel and the receptacle portion 12 are adequately flushed free of any remains of the comminuted fruit. At the same time, as the cold water has a substantially greater volume than the hot water, the temperature of the resultant mixture is relatively low.

In the process of preparing a beverage used by the apparatus described herein, and which is claimed in a co-pending application Serial No. 852,867, filed November 13, 1959, it will be appreciated that the cold or chilled water can be added to the beverage as prepared in the receptacle portion 12. The insertion of the cold water into the receptacle portion 12 via the funnel 13, as described above, has the advantage that it assists in removing solid particles from the receptacle portion. This is desirable since any solid particles retained may lead to a deterioration of the flavour of the beverage prepared subsequently.

It is intended that there should be maintained in reservoir 37 a quantity of the beverage which is several times that of the quantity which is prepared on each operation of the apparatus. It can then be arranged that the beverage in reservoir 37, even immediately after the addition of the newly prepared beverage from the receptacle portion 12, is at a temperature suitable for immediate consumption. Furthermore, the addition to the reservoir of the newly made beverage from the receptacle portion 12, does not raise the temperature of the contents of the reservoir unduly.

The beverage can be dispensed from an auxiliary reservoir 40, of relatively small volume but conveniently located at an upper part of the apparatus. Accordingly, beverage is drawn off from reservoir 37 by means of an electrically driven pump 41 and is fed to reservoir 40. An overflow device 42 is located in the reservoir 40 so that excess beverage is returned to the main reservoir 37. Conveniently, the overflow device 42 can take the form of a wide bore tube 43 concentric with a delivery tube 44 from pump 41. The beverage can be dispensed from a tap 45 from reservoir 40.

The apparatus can take various physical forms, but in one embodiment which has proved successful a generally rectangular construction has been adopted. In this construction the main reservoir 37 is located at the lower front part of the apparatus and is surmounted by the vessel 10 and its associated parts. The handles 26 and 33 are on the front upper part of the assembly and the reservoir 40 is displayed above the top of the construction. The pump and the apparatus associated with cooler 38 can then be located towards the rear of the assembly. The strainer 36 is made removable, so that after each preparation of beverage the strained fruit solids can be transferred to a disposal container.

It will be seen that the invention provides an apparatus by which a fruit beverage can be prepared at the point-of-sale in a manner which has not hitherto been possible.

Also the invention provides an apparatus by which a fruit beverage can be prepared in a manner which has not hitherto been possible. If the added materials, including sugar citric acid and colouring matter, with any further desired materials, are supplied packaged ready for addition to the hot water, the apparatus can readily be operated by the person who is dispensing it.

Figure 2:
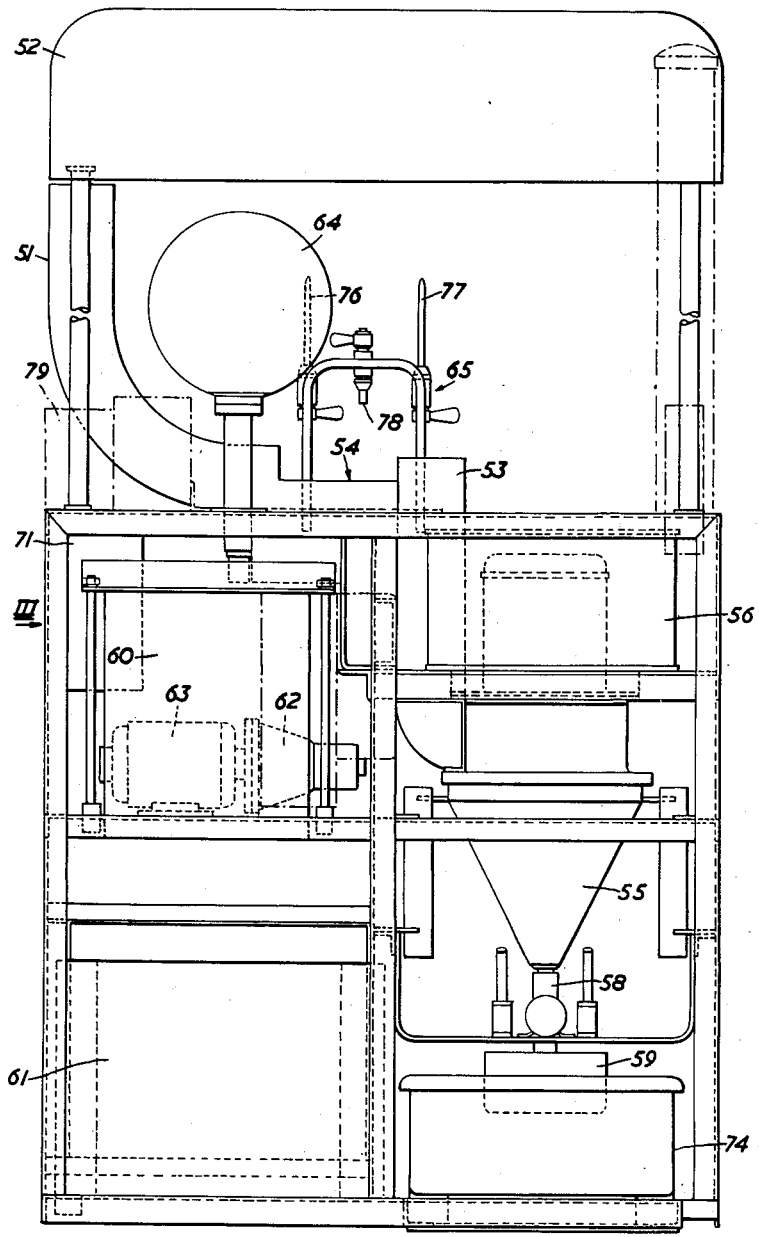
FIGURE 2 is a front view of an embodiment of the present invention in which the operation is fully automatic.
Figure 3:
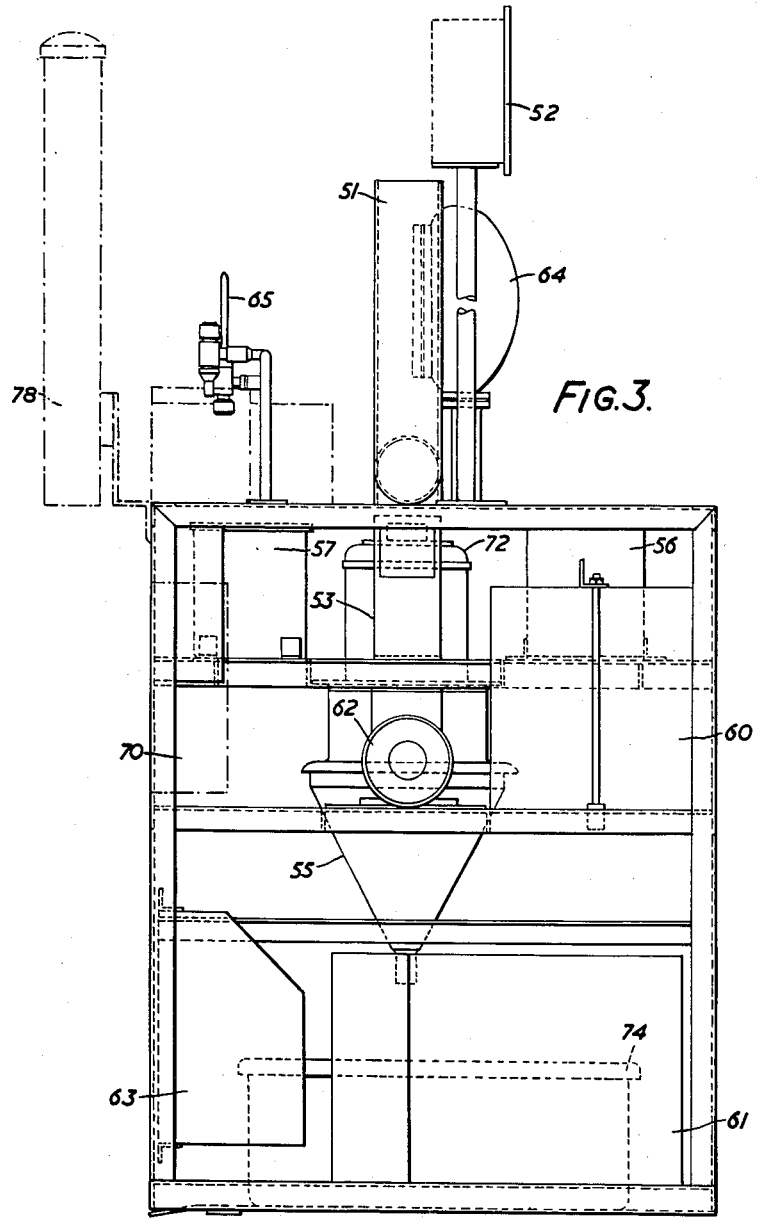
FIGURE 3 is a side view, looking in the direction of the arrow III in FIGURE 2, of the apparatus shown in FIGURE 2.
Figure 4:
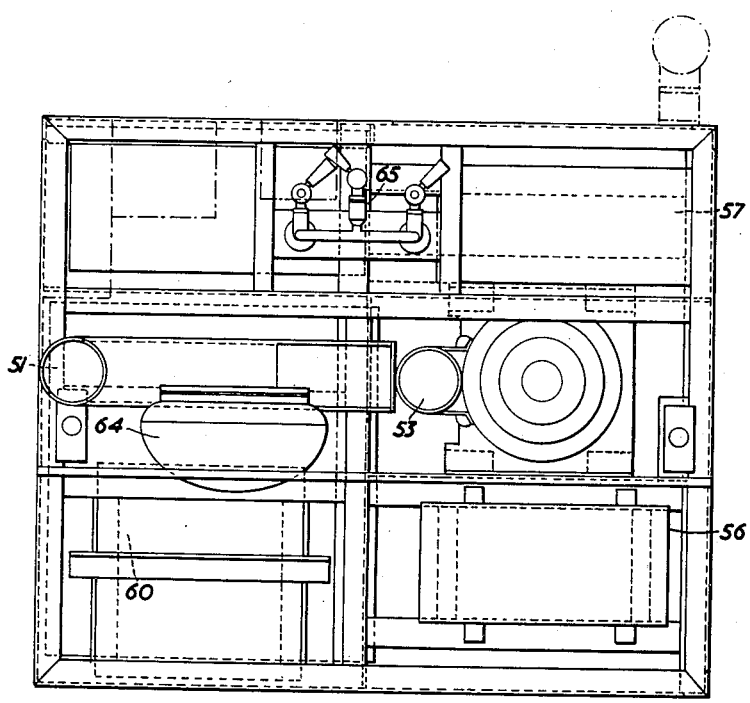
FIGURE 4 is a view from above of the apparatus shown in FIGURE 2.
Figure 8:
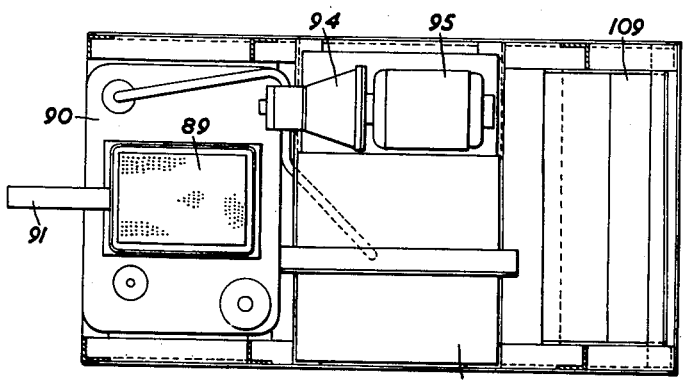
FIGURE 8 is a staggered section shown along the line VIII—VIII of FIGURE 6.
Figure 5:
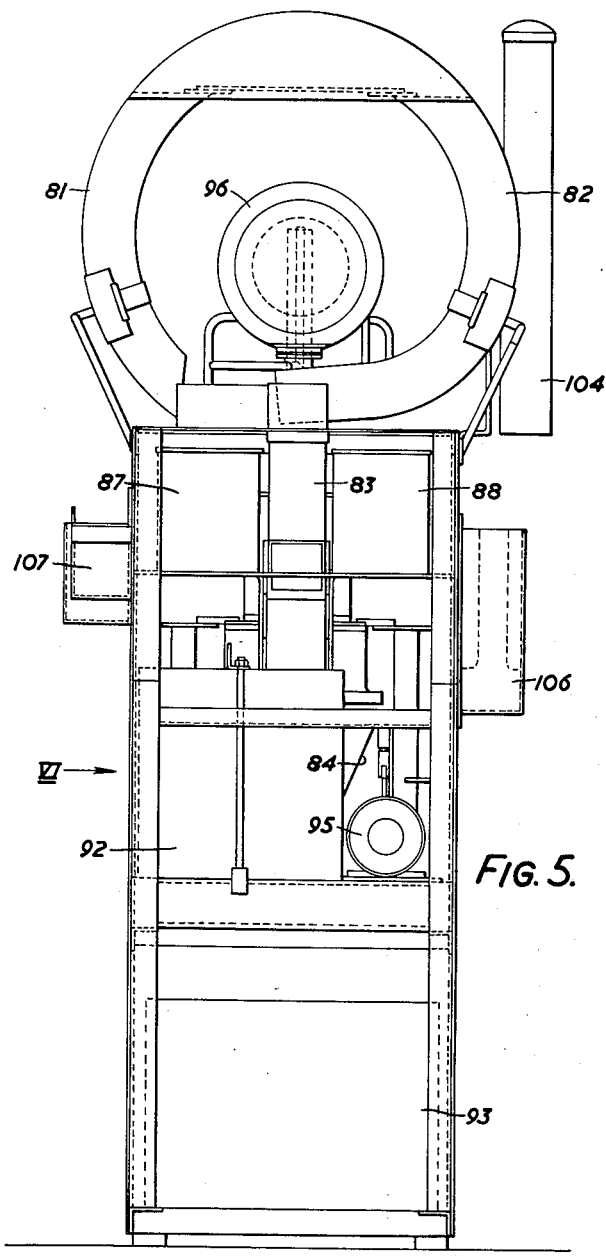
FIGURE 5 is a front view of a further automatically operating embodiment of the present invention.

The beverage making unit shown in FIGURES 2, 3 and 4 is a unit, intended to stand on a counter or like support. In this unit the fruit, assumed to be oranges, are inserted whole into the upper end of a pipe inlet 51, which upper end is behind an illuminated sign 52. The end of the pipe 51 is close to a further pipe inlet 53, and when a further charge of beverage is to be prepared, the appropriate number of oranges are transferred manually from the open end 54 of the pipe 51 to the pipe 53. This pipe 53 forms an inlet to the converter vessel 55, which corresponds to the converter vessel 10 shown in FIGURE 1.

Mounted above the converter vessel 55 is a hot water tank 56 to which the water supply is connected and which contains an immersion heater. Behind tank 56 is a cold water tank 57, also connected to the water supply. Both these tanks have valve controlled outlets to the converter vessel 55. The outlet 58 from converter vessel 55 communicates with a rectangular box 59 which contains the strainer (corresponding to 36, FIGURE 1), from which the beverage passes to the cooler 60, where cooling is performed by refrigeration machinery generally indicated at 61: From the cooler 60 the beverage can be circulated by a pump 62, driven by a motor 63, to a display tank 64 and a dispensing point 65.

Having described the apparatus of FIGURES 2, 3 and 4 in general terms, the process will now be described with reference thereto. The level of the beverage in the tank 64, which in effect acts as a contents gauge, indicates when the beverage needs replenishment. When this situation exists there is placed in the pipe 53 the contents of a sugar bag obtained from the container 70: this sugar bag contains sugar and additional matter such as colouring matter and citric acid as is needed in appropriate quantity. This is admitted to the converter vessel 55, as is a charge of hot water from the tank 56. This is effected by switches forming part of the control box 71. The sugar and other ingredients are mixed with the hot water in converter vessel 55 by an agitator driven by motor 72 to produce a hot sugar syrup. The period necessary to produce an adequate mixture is relatively short, and is less than the time needed for a charge of oranges to be transferred manually from the pipe 51 to pipe 53.

Whilst the ingredients are dissolving in water to form the syrup, the oranges are placed in pipe 53, and the inlet to converter vessel 55 again operated so that the oranges enter converter vessel 55, whereas already described, they are comminuted. The comminuting means and the agitator are driven by a common motor 72. A second charge of hot water is admitted, to wash fruit fragments off from comminuting disc. Thus there is produced in the converter vessel 55 a concentrated beverage base which is at a relatively high temperature. As already described, by producing comparatively small quantities at a time, this concentrate is produced quickly.

After a period adequate for the extraction of the essential oils and juices from the fruit, a charge of cold water, larger than the combined charges of hot water is admitted to the converter vessel 55 from the tank 57. The timing of this admission and the quantity of admission are determined automatically partly by a main control unit 73 and partly by arrangements similar to those already described with reference to FIGURE 1. At this time also the outlet 58 is operated so that the concentrate diluted with cold water, passes from converter vessel 55 to the box 59 in which is the strainer. This removes from the diluted concentrate which is now of the desired concentration, the major proportion of the solids in suspension leaving only a proportion of fruit sacs. The strained beverage passes from strainer box 59 to a further receptacle 74 (corresponding to the reservoir 37, FIGURE 1). From receptacle 74 the beverage is passed to the cooler 60, by pump 62. As already mentioned, beverage passes therefrom to the display tank 64, which has concentric overflow and supply pipes, arranged generally as described with reference to FIGURE 1.

The beverage is dispensed, from the dispensing point 65, either from one of two upstanding outlet pipes 76, 77, from a downward directed outlet 78. Each of these is controlled by its own handle. The beverage can be supplied to the consumer in either a waxed-paper cup or other like receptacle, in which case the outlet 78 is used, or in a flexible container formed of polythene or like sheet material. In the latter case the container which incorporates a non-return valve, is filled by placing it over the upper end of one of the outlet pipes 76, 77. In either case, the beverage leaves the outlet being used under pressure, this being due to the action of the pump 62. Cups may be stored in a cup dispenser indicated in broken lines at 78, while the broken line rectangles 79 represent a storage space for the above-mentioned containers and for drinking straws to be used therewith.

A typical formula for a replenishment charge of the orangeade includes:

(1) In the sugar bag one pound (454 grammes) of sugar, 12.2 grammes of dry citric acid, and a small amount, e.g., 100 milligrammes, of colouring matter.

(2) Hot water at 200° F. (93° C.): one charge of one pint (0.568 litre) for making the syrup and a second (cleaning) charge of half a pint (0.284 litre).

(3) Cold water at 40° F. (4° C.): one charge of four pints (2.272 litres).

(4) 0.45 lb. (204 grammes) of oranges. This will usually be two oranges, assuming an average weight per orange of 0.225 be .025 lb. (102 to 113 grammes).

The time for dissolving the sugar is about a half to three-quarters of a minute, and the agitation period after comminuting the oranges is about 5 seconds.

Th second form of apparatus, shown in FIGURES 5 to 8 is in general operation similar to the apparatus described above with reference to FIGURES 2 to 4, and so needs to be described only briefly. In these drawings the pipes 81, 82 are the storage pipes for oranges, from which oranges can be transferred to the pipe 83 for feeding the comminuting arrangements within the converter vessel 84. The comminuting arrangements and the agitator, both of which are in converter vessel 84, are driven by the motor 85. The sugar and other items list at (1), above, can be inserted via the side chute 86. Hot and cold water is supplied to the converter vessel 84 from a hot water tank 87 and a cold water tank 88.

When the hot beverage concentrate diluted with cold water leaves the converter vessel 84, it passes therefrom through a strainer 89 to a reservoir 90. The latter is provided with a handle 91 so that it can readily be removed from the machine for cleaning.

The beverage from the receptacle 90 to a cooler 92, operated by the refrigeration machinery 93, with which there is associated a pump 94, driven by a further motor 95, which pump maintains circulation through display tank 96 to the supply point 97. This supply point is similar to that of the apparatus of FIGURES 2, 3 and 4, and has two upstanding outlets 98 and 99, each with its own control handle, and another outlet 100, also with its own control handle. In these drawings, 101 represents the feed pipe to the display tank 96 while 102 represents the overflow pipe therefrom. The pipe 103 is the return pipe from the supply point 97 to the cooler 92.

Figure 6:
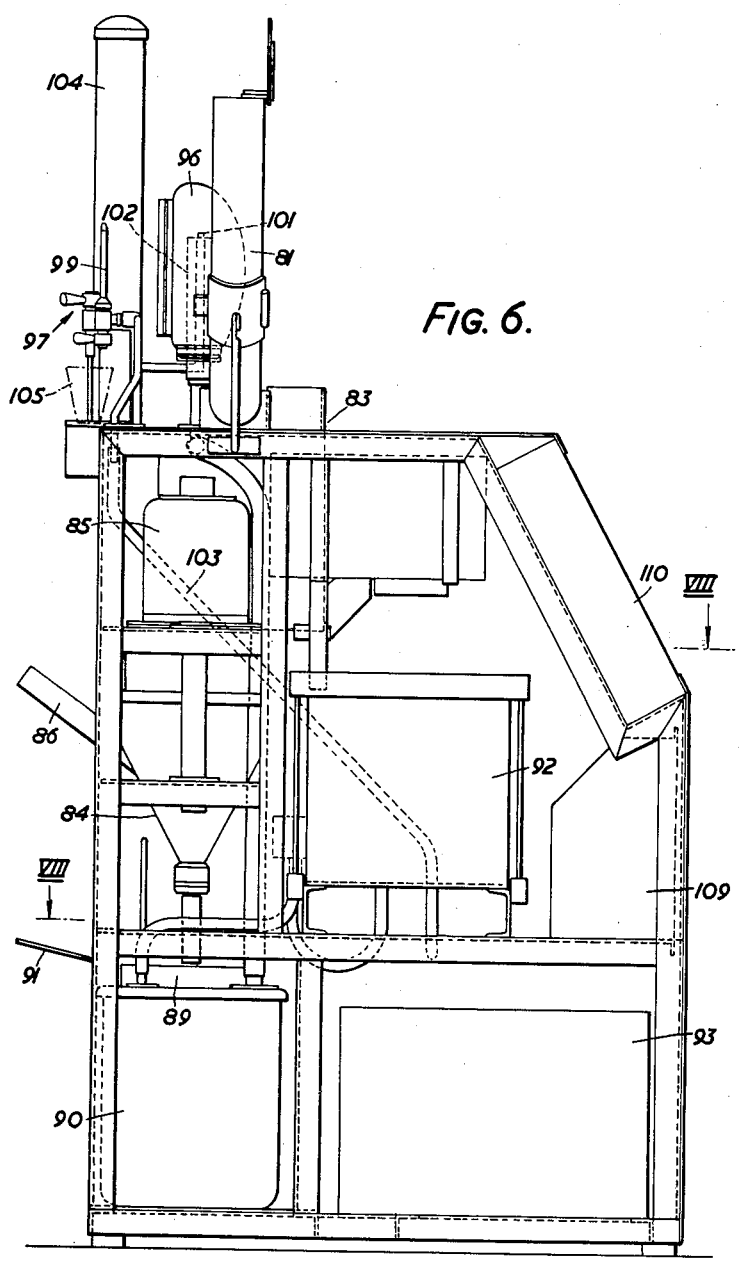
FIGURE 6 is a side view, looking in the direction of the arrow VI in FIGURE 5, of the apparatus shown in FIGURE 5.
Figure 7:
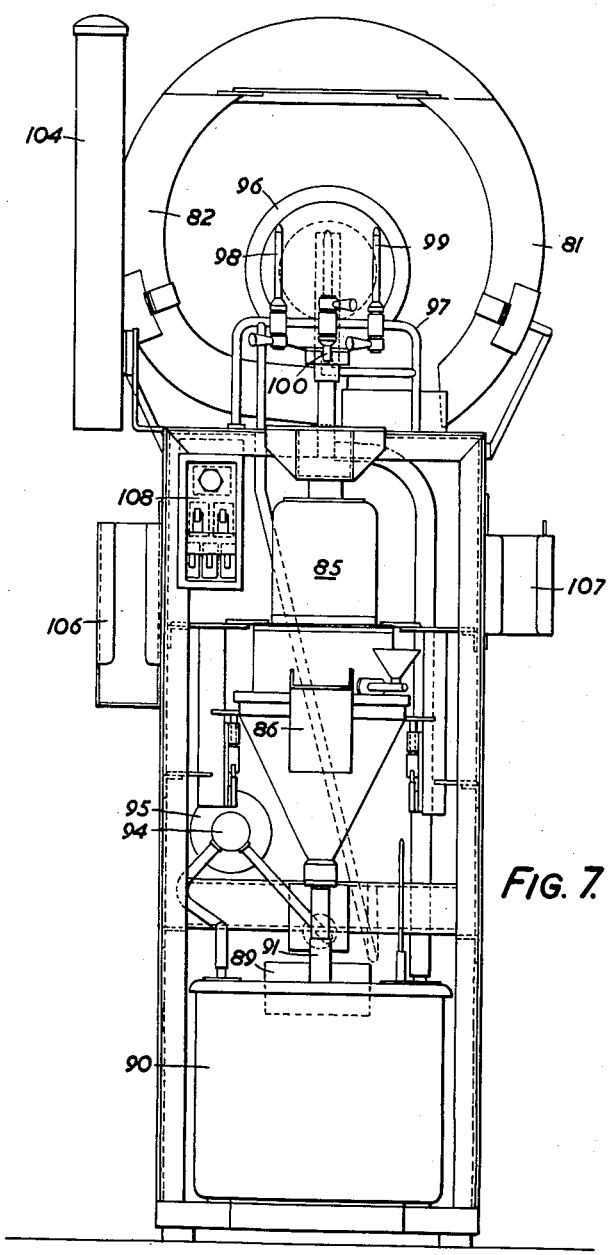
FIGURE 7 is a back view of the apparatus shown in FIGURE 5.

The cups to be filled from the outlet 100 are stored in a dispenser 104 and in FIGURE 6, one cup is shown in broken lines at 105 in the filling position. The flexible containers already mentioned and the straws are placed in storage spaces 106 and 107 respectively. The switch control box is shown at 108, while the main control box is shown at 109. The apparatus includes an illuminated sign 110.

We claim:

1. An apparatus for the preparation of a citrus fruit beverage in an immediately potable form from whole citrus fruit, which comprises a vessel, a fruit comminuting means arranged in said vessel, said vessel having an inlet via which a predetermined charge of whole citrus fruits may be applied to said fruit comminuting means, said fruit comminuting means being mounted in a first portion of said vessel and being adapted to comminute fruit applied thereto by said inlet, a receptacle formed by a second portion of the same vessel and adapted to receive from said fruit comminuting means comminution products formed by said comminution of said citrus fruit, a further inlet to said vessel via which a predetermined quantity of a heated liquid may be fed to said comminution product receptacle portion from a liquid heating means, an agitating device mounted in said receptacle portion and adapted to agitate the comminution products from said fruit comminution means in said heated liquid, means whereby a charge of relatively cold liquid may be fed to said receptacle portion, said charge of cold liquid being such as to dilute the result of its admixture with said heated liquid in which said comminution products have been agitated to a consistency which is suitable for immediate consumption, and an outlet from said receptacle portion via which the results of said agitation of said comminution products in said heated liquid and of the addition thereto of said cold liquid may be passed to a further liquid receptacle.

2. An apparatus as claimed in claim 1, and which further includes control means operable to meter the supply of heated liquid to said receptacle portion in such a way that the predetermined quantity of heated liquid is supplied to said receptacle portion in two portions, one portion of said liquid being supplied to said receptacle portion before said comminution and one being supplied thereto after said comminution, at least the second of said portions being applied to said receptacle portion via said comminuting means so as to remove therefrom any comminution products adhering thereto.

3. An apparatus for the preparation of a citrus fruit beverage in an immediately potable form from whole citrus fruit, and comprising a vessel, a receptacle formed by a portion of said vessel, said receptacle portion having an inlet via which solids including sugar may be supplied to said receptacle portion, water heating means connected to said receptacle portion, control means for feeding a predetermined quantity of heated water from said heating means to said receptacle portion, an agitating device mounted in said receptacle portion and adapted to agitate said solids in said water so as to produce in said receptacle portion a heated sugar syrup, fruit comminuting means including a movable comminuting member mounted in a further portion of said vessel and to which comminuting means a predetermined charge of citrus fruits may be applied via said inlet, said fruit comminuting means being so disposed with respect to said receptacle portion that the said receptacle portion is arranged to receive comminuting products from said fruit comminuting means, whereafter said agitating device agitates said comminution products in said heated sugar syrup in said receptacle portion so as to produce therein a heated beverage concentrate, and means whereby a charge of relatively cold water may be fed to said receptacle portion, said charge of cold water being of such a magnitude with respect to the quantity of heated liquid, as to dilute the result of its admixture with said heated liquid in which said comminution products have been agitated to a consistency which is suitable for immediate consumption, and an outlet from said receptacle portion via which the results of the agitation of said comminution products in said heated sugar syrup and of the addition thereto of said cold water may be passed thereto from to a further liquid-receiving receptacle.

4. An apparatus as claimed in claim 3, and which comprises an electric motor whose function is to drive both said comminuting means and said agitating device, said electric motor being mounted on top of said vessel, and having an output shaft which extends into said vessel a considerable extent, said output shaft carrying both the movable member of said comminuting means and said agitating device.

5. An apparatus for the production of a citrus fruit beverage in an immediately potable form from whole citrus fruits, and comprising a vessel having a portion thereof constituted as a receptacle, said vessel having an inlet via which solids including sugar, flavouring and colouring matter may be supplied to said receptacle portion, water heating means connected via conduit means to said receptacle portion, control means in said conduit means for causing a first predetermined charge of heated water to be fed from said heating means to said receptacle portion, an agitating device mounted in said receptacle portion and adapted to agitate said solids in said water so as to produce in said receptacle portion a heated sugar syrup, a fruit comminuting means mounted in said vessel and to which a predetermined charge of citrus fruit may be applied from said inlet, said fruit comminuting means being so disposed in said vessel with respect to said receptacle portion that said receptacle portion can receive from said comminuting means comminution products due to the comminuting of fruit, whereafter said comminution products are agitated in said heated sugar syrup by said agitating device so as to produce a heated beverage concentrate, further control means in said conduit means for causing a further predetermined charge of heated water to be fed from said heating means to said receptacle portion, said further charge of heated water being supplied to said receptacle portion via said comminuting means so as to wash therefrom any comminution products adhering thereto, means whereby a charge of relatively cold water may be fed to said receptacle portion, said charge of cold water having a larger volume than the sum total of the two charges of heated water, and having a volume such as to dilute the result of its admixture with said heated liquids in said receptacle portion to a consistency which is suitable for immediate consumption, an outlet from said vessel via which the beverage produced in said receptacle portion may be passed to a further receptacle, whereby said further receptacle receives said beverage after it has been strained and has thereby had at least the larger fruit fragments due to said comminution removed, and refrigeration means associated with and mounted within said further receptacle and arranged to cool the prepared beverage to the temperature at which it is to be served to a consumer.

References Cited in the file of this patent

UNITED STATES PATENTS

| | | |
|---|---|---|
| 2,087,465 | Bacher et al. | July 20, 1937 |
| 2,301,461 | Schnetz | Nov. 10, 1942 |
| 2,712,887 | King | July 12, 1955 |
| 2,942,985 | Stewart | June 28, 1960 |

FOREIGN PATENTS

| | | |
|---|---|---|
| 729,200 | Great Britain | 1955 (void) |